(12) United States Patent
Takashi

(10) Patent No.: US 10,710,452 B2
(45) Date of Patent: Jul. 14, 2020

(54) FUEL LID STRUCTURE

(71) Applicant: TOYOTA JIDOSHA KABUSHIKI KAISHA, Toyota-shi, Aichi-ken (JP)

(72) Inventor: Toshinobu Takashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 16/204,187

(22) Filed: Nov. 29, 2018

(65) Prior Publication Data

US 2019/0184818 A1 Jun. 20, 2019

(30) Foreign Application Priority Data

Dec. 18, 2017 (JP) .................................. 2017-241680

(51) Int. Cl.
*B60K 15/05* (2006.01)

(52) U.S. Cl.
CPC ........ *B60K 15/05* (2013.01); *B60K 2015/053* (2013.01); *B60K 2015/0546* (2013.01); *B60K 2015/0553* (2013.01)

(58) Field of Classification Search
CPC .............. B60K 15/05; B60K 2015/053; B60K 2015/0546; B60K 2015/0553
USPC ..................................................... 296/97.22
See application file for complete search history.

(56) References Cited

U.S. PATENT DOCUMENTS

| | | | | | |
|---|---|---|---|---|---|
| 4,782,978 | A | * | 11/1988 | Appleby | B60K 15/05 220/DIG. 33 |
| 5,437,491 | A | * | 8/1995 | Nedbal | B60K 15/0406 220/86.2 |
| 5,772,062 | A | * | 6/1998 | Gramss | B60K 15/05 16/287 |
| 5,836,638 | A | * | 11/1998 | Slocum | B60K 15/05 296/97.22 |
| 2010/0133024 | A1 | * | 6/2010 | Miwa | B60K 6/365 180/65.21 |
| 2011/0155239 | A1 | | 6/2011 | Biro et al. | |
| 2013/0249234 | A1 | * | 9/2013 | Higgins | B60K 15/05 296/97.22 |
| 2016/0101686 | A1 | * | 4/2016 | Brown | B60K 15/05 296/97.22 |
| 2019/0135106 | A1 | * | 5/2019 | Sasaki | B60K 15/05 |
| 2019/0184818 | A1 | * | 6/2019 | Takashi | B60K 15/05 |
| 2019/0232782 | A1 | * | 8/2019 | Takeuchi | B60K 15/05 |
| 2019/0267741 | A1 | * | 8/2019 | Sawada | E05B 83/34 |

FOREIGN PATENT DOCUMENTS

| | | |
|---|---|---|
| JP | 2011-106198 A | 6/2011 |
| JP | 2016-068639 A | 5/2016 |

* cited by examiner

*Primary Examiner* — Gregory A Blankenship
(74) *Attorney, Agent, or Firm* — Oliff PLC

(57) ABSTRACT

A fuel lid structure includes: a lid box constituting a fuel opening portion of a vehicle body; a lid hinge that is made of resin and is pivotable with respect to the lid box; a fuel lid body pivotably attached to the lid box via the lid hinge; and an alerting unit configured to alert a replenishment worker to a body or the like of the replenishment worker hitting the fuel lid body in an open state by at least one of imparting of a sense of resistance and emission of a sound.

21 Claims, 9 Drawing Sheets

FUEL LID STRUCTURE

INCORPORATION BY REFERENCE

The disclosure of Japanese Patent Application No. 2017-241680 filed on Dec. 18, 2017 including the specification, drawings and abstract is incorporated herein by reference in its entirety.

BACKGROUND

1. Technical Field

The disclosure relates to a fuel lid structure.

2. Description of Related Art

As an attachment structure for a fuel lid (lid) opening and closing a fuel opening portion into which a replenishment gun is inserted during vehicle energy replenishment, a fuel lid structure is known in which a fuel lid is attached in an openable and closable manner via a lid hinge with respect to a lid box constituting the fuel opening portion.

In the fuel lid structure as described above, the buttocks or the like of an energy replenishment worker (hereinafter, simply referred as a "replenishment worker") may accidentally hit the fuel lid open during vehicle energy replenishment. An excessive external force may be applied for such reasons, and then the lid hinge may pivot beyond a set pivoting range (overstroke) and the fuel lid may interfere with an outer plate panel and so on.

For example, Japanese Unexamined Patent Application Publication No. 2016-068639 (JP 2016-068639 A) discloses a lid structure provided with a lid box joined to an opening formed on an outer plate panel and a lid portion blocking the opening via a hinge pivotably fixed in the lid box. In this structure, an exterior panel is recessed inwards as pivoting of the hinge is regulated as a result of contact with the lid box.

The lid structure disclosed in JP 2016-068639 A has the exterior panel that can be deformed so as to be recessed in response to an excessive external force applied to the fuel lid. Accordingly, it is possible to suppress interference between the edge end of the fuel lid and the surface of the exterior panel.

SUMMARY

In relatively many fuel lid structures as described above, lid boxes, lid hinges, and so on are formed of lightweight resin in place of metal in the interest of vehicle body weight reduction and so on. For this reason, an excessive external force may be applied when the buttocks or the like of a replenishment worker hits a fuel lid body that is in, for example, a full open state (hereinafter, also referred to as the "maximum open state"). Then, a resinous lid hinge supporting the fuel lid body may be damaged.

The lid structure disclosed in JP 2016-068639 A is to suppress interference between the edge end of the fuel lid body and the surface of the exterior panel on the premise that the lid hinge overstrokes when an excessive external force is applied. On the other hand, when the lid hinge overstrokes, the lid hinge itself may be damaged in some cases. In this regard, there is room for improvement in the lid structure disclosed in JP 2016-068639 A.

The event that the buttocks or the like of a replenishment worker accidentally hit the fuel lid body is particularly likely in a vehicle in which a fuel lid body open obliquely upwards and a replenishment gun are hard to be wrapped (the fuel lid body is not hidden by the replenishment gun) when seen in the front-rear direction of the vehicle. Specifically, the event is particularly likely in a fuel cell vehicle in which a hydrogen filling gun is horizontally inserted into a fuel opening portion for performance reasons. Still, the event is a problem that can occur in, for example, an electric vehicle (EV) using a charging gun as well (in this specification, the meaning of "horizontally" includes "substantially horizontally").

The disclosure provides a fuel lid structure-related technique suppressing damage to a lid hinge for attaching a fuel lid body even in a case where a replenishment worker's body or the like accidently hits the fuel lid body.

In the fuel lid structure, a replenishment worker is alerted, prior to lid hinge overstroke, to the replenishment worker's body or the like hitting a fuel lid body.

A first aspect of the disclosure provides a fuel lid structure including: a lid box constituting a fuel opening portion of a vehicle body; a lid hinge that is made of resin and is pivotable with respect to the lid box; a fuel lid body pivotably attached to the lid box via the lid hinge; and an alerting unit configured to alert a replenishment worker to a body or the like of the replenishment worker hitting the fuel lid body in an open state by at least one of imparting of a sense of resistance and emission of a sound.

With the configuration according to the first aspect of the disclosure, it is possible to alert the replenishment worker to hitting the fuel lid body, by imparting a sense of resistance to the replenishment worker's body, even in a case where the replenishment worker's body or the like accidentally hits the fuel lid body open during vehicle energy replenishment. Therefore, it is possible to alert the replenishment worker even when the replenishment worker's body or the like hitting the fuel lid body (initial abutting) puts the fuel lid body into, for example, a maximum open state, and thus the replenishment worker's body or the like hitting the fuel lid body again (second and subsequent abutting) can be suppressed. As a result, damage to the resinous lid hinge can be suppressed.

Likewise, a sound is emitted also in a case where the replenishment worker's body or the like accidentally hits the fuel lid body open during vehicle energy replenishment, and thus it is possible to alert the replenishment worker to fuel lid body hitting and damage to the resinous lid hinge can be suppressed. Moreover, according to the aspect described above, a sound is emitted even in a case where, for example, the replenishment worker's clothes or the like hit and are caught by the fuel lid body open during vehicle energy replenishment, that is, even in a case where a sense of resistance is unlikely to be imparted to the replenishment worker's body. Accordingly, it is possible to alert the replenishment worker to fuel lid body hitting in a reliable manner.

In the first aspect, the alerting unit may include an engaging portion provided at the lid hinge, and an engaged portion provided at the lid box and engageable with the engaging portion; and the engaging portion and the engaged portion may be configured to engage in a case where the fuel lid body is opened by a predetermined angle set to be smaller than a maximum open angle and to impart the sense of resistance by disengagement in a case where the fuel lid body is opened by more than the predetermined angle.

According to the above configuration, engagement occurs between the engaging portion provided at the lid hinge and the engaged portion provided at the lid box in a case where the fuel lid body is opened by a predetermined angle. In other words, pivoting of the lid hinge with respect to the lid box is restricted. Accordingly, replenishment work can be smoothly performed, with the fuel lid body open by the standard open angle of the fuel lid body during vehicle energy replenishment, once, for example, the predetermined angle is set to the standard open angle.

A state where pivoting of the lid hinge is restricted is maintained, even in a case where the replenishment worker's body or the like accidentally hits the fuel lid body open during vehicle energy replenishment, when, for example, the hitting is weak and the engaging portion and the engaged portion remain engaged. Accordingly, damage to the lid hinge can be suppressed.

The predetermined angle is set to be smaller than the maximum open angle of the fuel lid body. Accordingly, even in a case where the replenishment worker's body or the like hits the fuel lid body and the fuel lid body is opened by more than the predetermined angle as a result, there is a margin (pivoting margin) until the fuel lid body reaches the maximum open angle after exceeding the predetermined angle. Damage to the lid hinge can be suppressed as a result.

In the case described above, a sense of resistance is imparted to the replenishment worker's body by disengagement between the engaging portion and the engaged portion. Accordingly, it is possible to alert the replenishment worker to the replenishment worker's body or the like hitting the fuel lid body. Therefore, it is possible to suppress, for example, the replenishment worker's body or the like hitting the fuel lid body in the maximum open state again, and thus damage to the resinous lid hinge can be suppressed.

In the above configuration, the engaging portion may be provided with a first projecting portion; the engaged portion may be a first recessed portion into which the first projecting portion is fitted during a process in which the fuel lid body is opened; and the first projecting portion and the first recessed portion may be configured to be fitted in the case where the fuel lid body is opened by the predetermined angle and to impart the sense of resistance by the first projecting portion climbing over the first recessed portion in the case where the fuel lid body is opened by more than the predetermined angle.

With the above configuration according, a state where the fuel lid body is open by a predetermined angle can be easily maintained by a simple configuration in which the first projecting portion is fitted into the first recessed portion. Accordingly, replenishment work can be smoothly performed once, for example, the predetermined angle is set to the standard open angle of the fuel lid body during vehicle energy replenishment. Even in a case where the replenishment worker's body or the like accidentally hits the fuel lid body open during vehicle energy replenishment, a sense of resistance is surely imparted to the replenishment worker's body as the first projecting portion climbs over the first recessed portion, and thus it is possible to reliably alert the replenishment worker to the replenishment worker's body or the like hitting the fuel lid body.

In the first aspect, a plurality of the first projecting portions and a plurality of the first recessed portions may be provided.

With the above configuration, a sense of resistance is imparted to the replenishment worker's body every time the first projecting portion climbs over the first recessed portions. In other words, alerting is performed a plurality of times. Accordingly, damage to the lid hinge can be more reliably suppressed.

In the first aspect, a protruding portion may be provided in the lid box, the protruding portion being continuous with the first recessed portion and protruding to a side opposite to the first recessed portion, the protruding portion being provided on a side of the first recessed portion in the lid box to which the first projecting portion moves in the case where the fuel lid body is opened by more than the predetermined angle.

In the above configuration, the first projecting portion should climb over the protruding portion as well when climbing over the first recessed portion. Accordingly, the fuel lid body is unlikely to pivot even in a case where the replenishment worker's body or the like accidentally hits the fuel lid body, and thus damage to the lid hinge can be suppressed and it is possible to alert the replenishment worker to the replenishment worker's body or the like hitting the fuel lid body.

A stronger sense of resistance is imparted to the replenishment worker's body, even when the fuel lid body pivots, as the first projecting portion climbs over the protruding portion. As a result, it is possible to alert the replenishment worker to the replenishment worker's body or the like hitting the fuel lid body in a more reliable manner. Accordingly, damage to the lid hinge can be suppressed in a more reliable manner.

In the first aspect, the lid box may have a hinge pin. The lid hinge may be pivotable with respect to the lid box about the hinge pin by the hinge pin being inserted into a hole formed in the lid hinge. The engaging portion may include a second recessed portion formed in a hole wall of the hole. The engaged portion may be a second projecting portion formed on a peripheral surface of the hinge pin. The second projecting portion and the second recessed portion may be configured to be fitted in the case where the fuel lid body is opened by the predetermined angle and to impart the sense of resistance by the second projecting portion climbing over the second recessed portion in the case where the fuel lid body is opened by more than the predetermined angle.

With the above configuration, a sense of resistance is surely imparted to the replenishment worker's body, by the second projecting portion formed on the peripheral surface of the hinge pin climbing over the second recessed portion formed in the hole wall, even in a case where the replenishment worker's body or the like hits the fuel lid body. Accordingly, it is possible to reliably alert the replenishment worker to the replenishment worker's body or the like hitting the fuel lid body. As a result, damage to the lid hinge can be reliably suppressed.

In the first aspect, the alerting unit may include: a first sensor provided at the lid hinge; a second sensor provided at the lid box; and a warning sound generation mechanism configured to emit a warning sound upon contact between the first sensor and the second sensor. The first sensor and the second sensor may be disposed so as to come into contact with each other in a case where the fuel lid body is opened by a maximum open angle.

With the above configuration, it is possible to reliably alert the replenishment worker to the replenishment worker's body or the like hitting the fuel lid body, even in a case where the fuel lid body is opened by the maximum open angle by the replenishment worker's body or the like hitting the fuel lid body, as the warning sound results from contact between the first sensor provided at the lid hinge and the second sensor provided at the lid box. Accordingly, the replenishment worker's body or the like hitting the fuel lid body again can be suppressed as in the case of the replenishment worker alerted by the sense of resistance imparted to the replenishment worker's body. As a result, damage to the resinous lid hinge can be reliably suppressed.

Also in the case of the alerting by means of sound emission, it is desirable, in the interest of more reliable lid hinge damage suppression, that there is a margin until the fuel lid body reaches the maximum open state after warning sound generation.

In the first aspect, the alerting unit may include: a pressure sensor provided at any one of the lid hinge and the lid box; an elastic member provided at the other of the lid hinge and the lid box; and a warning sound generation mechanism configured to emit a warning sound upon detection of a predetermined pressure by the pressure sensor. The pressure sensor and the elastic member may be disposed such that the predetermined pressure is imparted from the elastic member to the pressure sensor in a case where the fuel lid body is opened by more than a predetermined angle set to be smaller than a maximum open angle.

In the above configuration, a predetermined pressure is imparted from the elastic member to the pressure sensor and a warning sound is emitted once the fuel lid body is opened by more than a predetermined angle by the buttocks or the like of the replenishment worker hitting the fuel lid body. Accordingly, it is possible to reliably alert the replenishment worker to the replenishment worker's body or the like hitting the fuel lid body. Moreover, damage to the lid hinge can be more reliably suppressed as there is a margin, to the same extent as elastic member shrinkage, until the fuel lid body reaches the maximum open angle after exceeding the predetermined angle.

A second aspect of the disclosure provides a fuel lid structure including: a lid box constituting a fuel opening portion of a vehicle body; a lid hinge that is made of resin and is pivotable with respect to the lid box; a fuel lid body pivotably attached to the lid box via the lid hinge; and a mechanism configured to execute at least one of suppression of pivoting of the fuel lid body in an open state at a predetermined angle in an open direction and emission of a sound in a case where a force to pivot the fuel lid body in the open direction by more than the predetermined angle is imparted to the fuel lid body.

As described above, with the fuel lid structures according to the first and second aspects of the disclosure, damage to the lid hinge attached to the fuel lid body can be suppressed even in a case where a replenishment worker's body accidentally hits the fuel lid body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the disclosure will be described with reference to accompanying drawings. In FIGS. 2 to 4 and FIGS. 7 to 16, which are cross-sectional views, hatching representing cross sections is omitted so that the drawings are easy to see.

First Embodiment

Fuel Lid Structure

Figure 1:
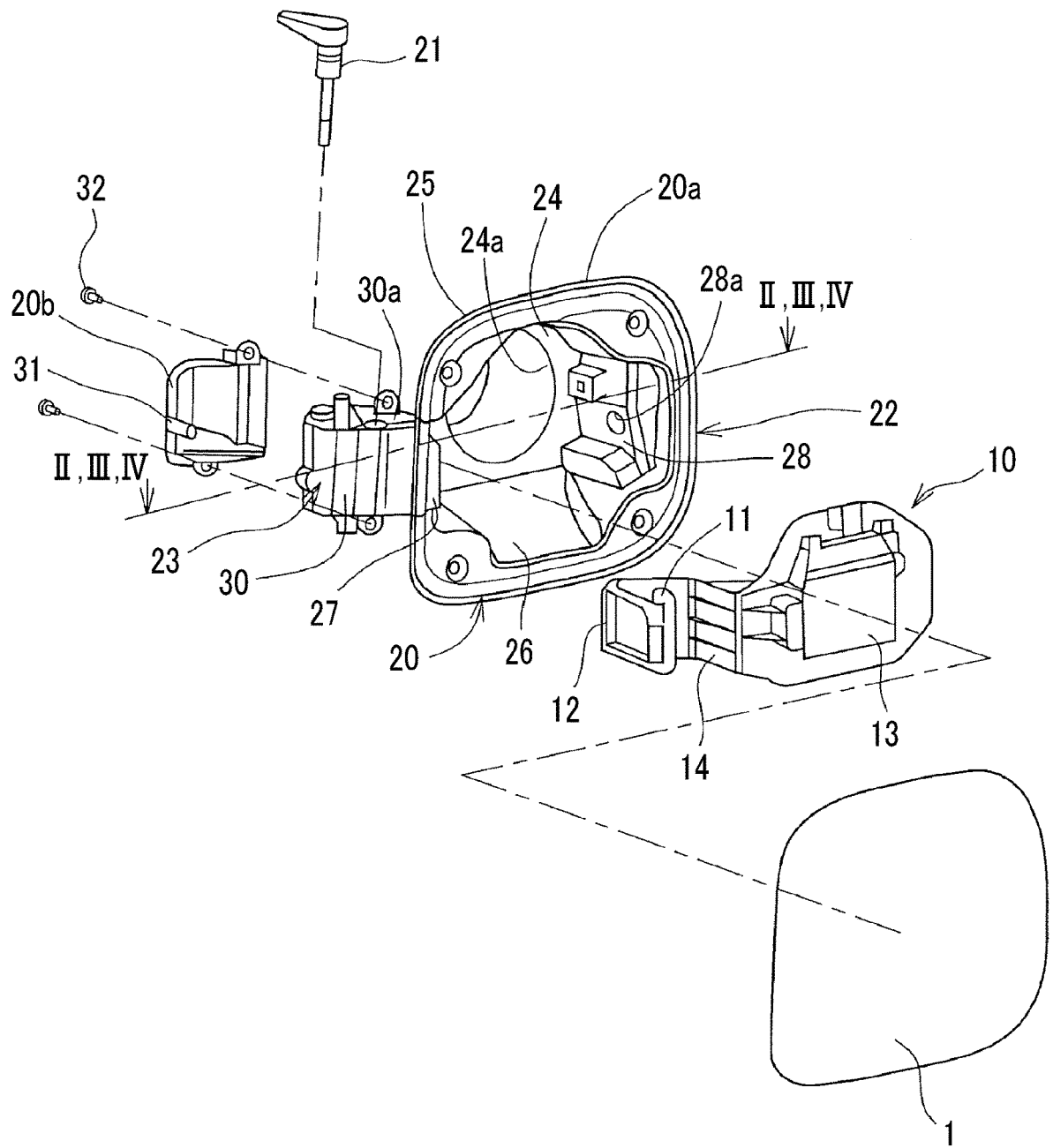
FIG. 1 is an exploded perspective view schematically illustrating a fuel lid structure according to a first embodiment of the disclosure.
Figure 2:
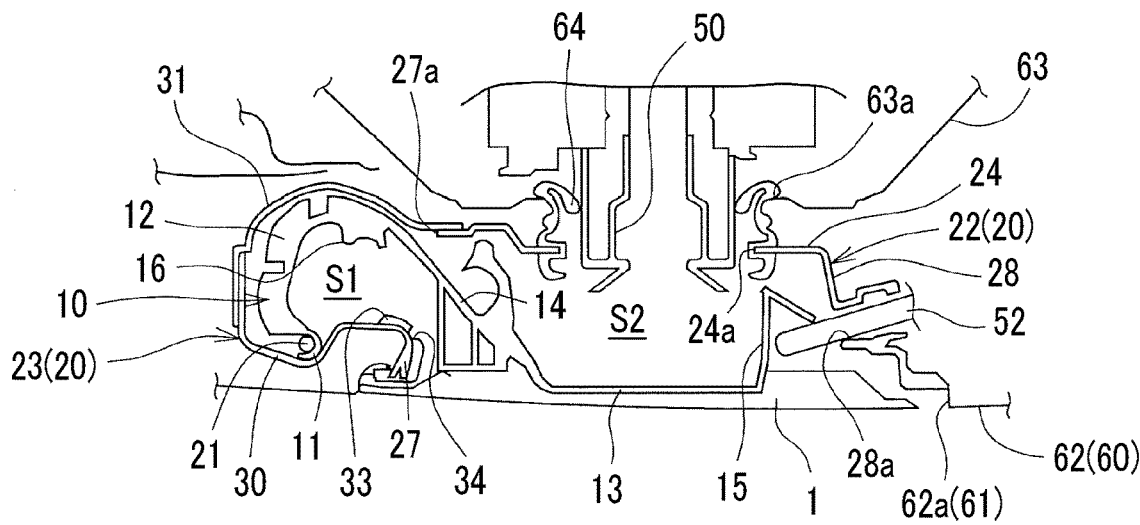
FIG. 2 is an arrow cross-sectional view taken along line II-II of FIG. 1, schematically illustrating a state where a fuel lid is closed.
Figure 3:
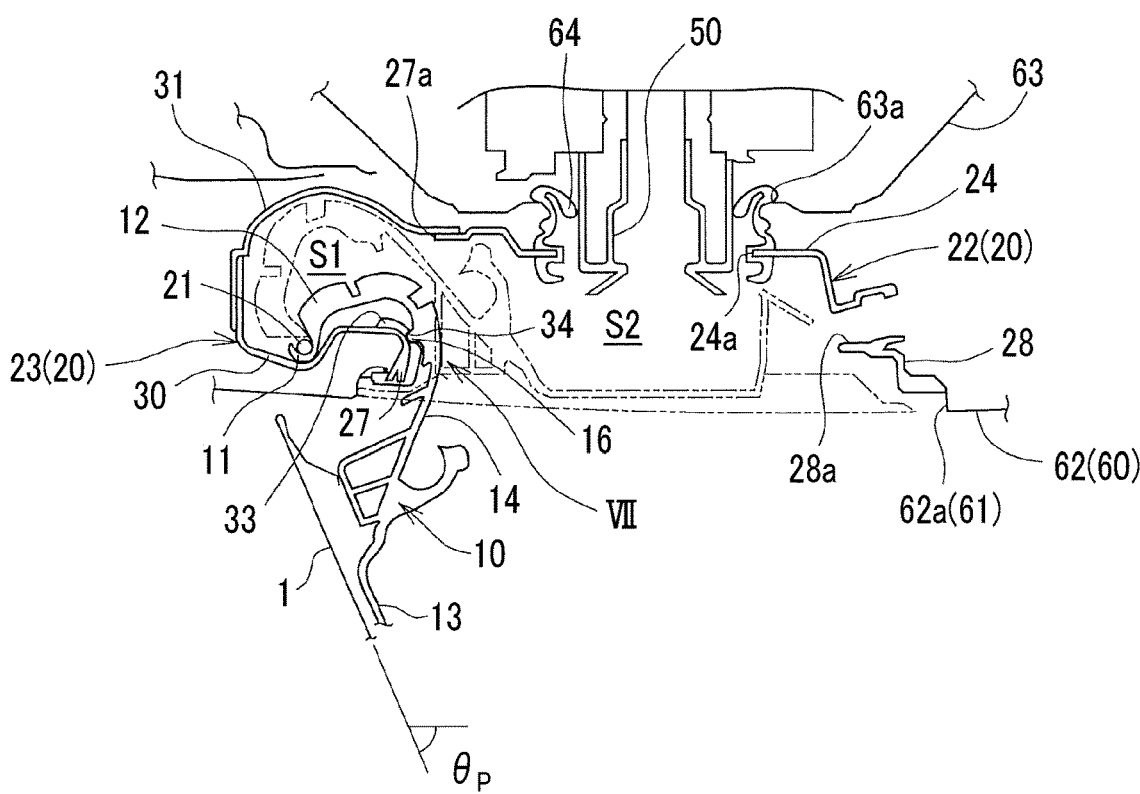
FIG. 3 is an arrow cross-sectional view taken along line III-III of FIG. 1, schematically illustrating a state where the fuel lid is open during filling.
Figure 4:
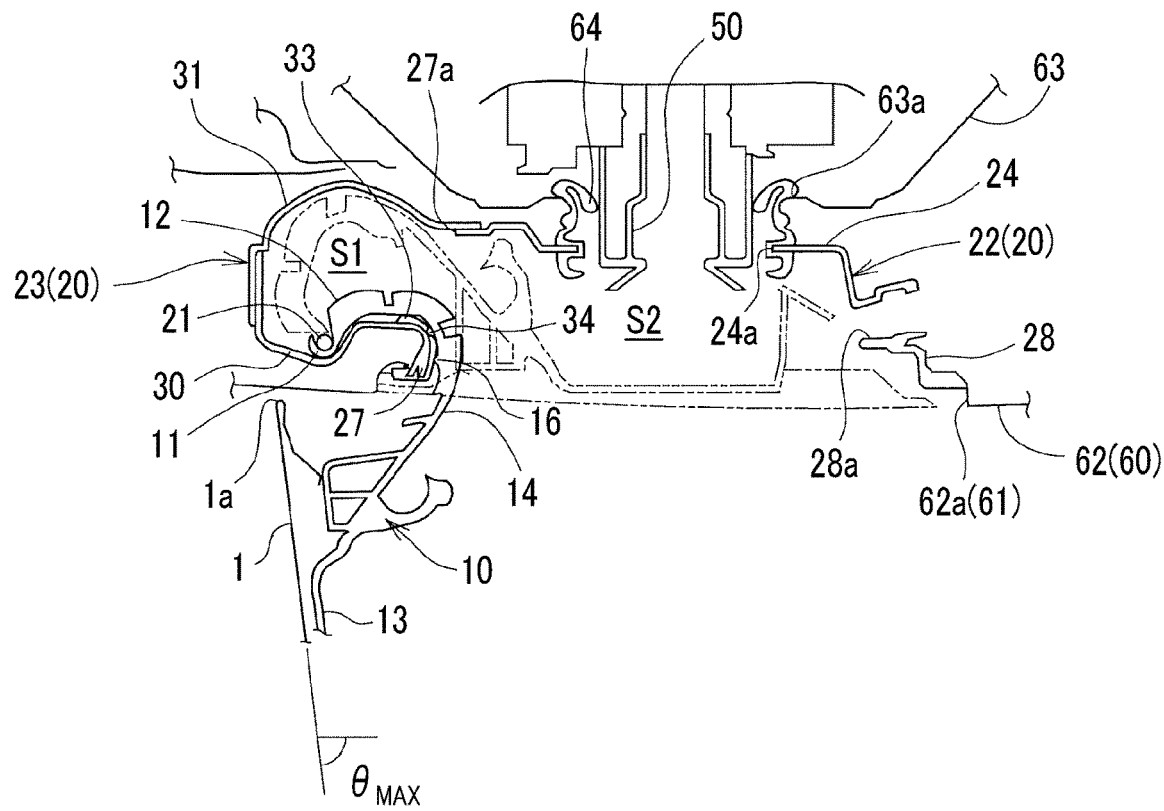
FIG. 4 is an arrow cross-sectional view taken along line IV-IV of FIG. 1, schematically illustrating the maximum open state of the fuel lid.

FIG. 1 is an exploded perspective view schematically illustrating a fuel lid structure according to a first embodiment of the disclosure. FIG. 2 is an arrow cross-sectional view taken along line II-II of FIG. 1, schematically illustrating a state where a fuel lid 1 is closed. FIG. 3 is an arrow cross-sectional view taken along line of FIG. 1, schematically illustrating a state where the fuel lid body 1 (hereinafter, also referred to as fuel lid 1) is open during filling. FIG. 4 is an arrow cross-sectional view taken along line III-III of FIG. 1, schematically illustrating the maximum open state of the fuel lid 1. The fuel lid structure is mounted on a fuel cell vehicle provided with a filling port 50 for high-pressure hydrogen gas filling. As illustrated in FIG. 1, the fuel lid structure is provided with a lid box 20 constituting a fuel opening portion 61 of a vehicle body 60, a lid hinge 10 pivotable with respect to the lid box 20 about a lid hinge pin 21 provided at the lid box 20, and the fuel lid 1 as a lid pivotably attached to the lid box 20 via the lid hinge 10.

As illustrated in FIGS. 1 to 4, the lid box 20 has a rectangular box-shaped box body portion 22 open toward an opening 62*a* (to the outside of a vehicle cabin) formed in a side member outer panel 62 and a hinge support portion 23 integrally formed on the vehicle front-rear direction front side of the box body portion 22. As illustrated in FIG. 1, the lid box 20 is a resin molded article having a two-part structure and includes a first box member 20*a* constituting a part of the box body portion 22 and the hinge support portion 23 (outside of the vehicle cabin) and a second box member 20*b* as a lid portion constituting the other portion of the hinge support portion 23 (inside of the vehicle cabin).

The box body portion 22 has an inside wall portion 24 facing the opening 62*a* of the side member outer panel 62 and an upper wall portion 25, a lower wall portion 26, a front wall portion 27, and a rear wall portion 28 extending to the outside of the vehicle cabin from the upper end portion of the inside wall portion 24, the lower end portion of the inside wall portion 24, the front end portion of the inside wall portion 24 in the vehicle front-rear direction, and the rear end portion of the inside wall portion 24 in the vehicle front-rear direction, respectively. As described above, the box body portion 22 is formed in a rectangular box shape open toward the opening 62*a* of the side member outer panel 62. The box body portion 22 is fixed to the side member outer panel 62 by the tip portions of the upper wall portion 25, the lower wall portion 26, the front wall portion 27, and the rear wall portion 28 being fastened via bolts (not illustrated) to the peripheral edge portion of the opening 62*a*.

As illustrated in FIG. 2, a circular hole 24*a* is formed to penetrate the inside wall portion 24 for the filling port 50 to be inserted. The filling port 50 extends to the outside of the vehicle cabin through an opening portion 63*a* of a wheel house outer panel 63. As a result, a hydrogen filling gun 51 (refer to FIG. 5A and FIG. 5B) inserted into the fuel opening portion 61 during vehicle energy replenishment can be connected to the filling port 50. The circular hole 24*a* and the opening portion 63*a* of the wheel house outer panel 63 are connected by a rubber seal 64. Also, the clearance between the opening portion 63*a* and the filling port 50 is sealed by the rubber seal 64. The hinge support portion 23 is connected to the front wall portion 27. A communication opening 27*a* is formed in the front wall portion 27 for communication between a pivoting space S1 provided in the hinge support portion 23 and a space S2 surrounded by the box body portion 22. A lock hole 28*a* is formed to penetrate the rear wall portion 28. A lock pin 52 is retractably inserted into the lock hole 28*a*. The lock pin 52 allows the fuel lid 1 to switch between locked and unlocked states.

As illustrated in FIGS. 1 and 2, the hinge support portion 23 is configured such that a space (pivoting space S1) is formed in the hinge support portion 23 by an outside hinge support portion 30 and an inside hinge support portion 31 being combined and fastened by a bolt 32. The outside hinge support portion 30 bulges outwards and is in front of the front wall portion 27 of the first box member 20*a* in the vehicle front-rear direction. The inside hinge support portion 31 bulges inwards, and the second box member 20*b* constitutes the inside hinge support portion 31. A boss portion (not illustrated) into which the lid hinge pin 21 is inserted is formed in an upper wall portion 30*a*, which is provided in the upper end portion of the outside hinge support portion 30 and covers the pivoting space S1 from above. The lid hinge pin 21 may be resinous or metallic.

The pivoting space S1 is formed in a shape that allows an engagement hook portion 11 and a pivoting hook portion 12 of the lid hinge 10, which will be described later, to be pivotably accommodated. Specifically, the pivoting space S1 is formed in the same shape as the trajectory drawn by the engagement hook portion 11 and the pivoting hook portion 12 when the lid hinge 10 pivots from the closed state in FIG. 2 to the maximum open state in FIG. 4 about the lid hinge pin 21 (here, the meaning of "the same shape" includes "almost the same shape"). A stopper portion 33 protruding to the inside of the vehicle cabin is formed in the outside hinge support portion 30. The fuel lid 1 is put into the maximum open state when the lid hinge 10 pivoted in the clockwise direction of FIG. 2 about the lid hinge pin 21 abuts against the stopper portion 33.

The lid hinge 10 is a resin molded article and has the engagement hook portion 11, the pivoting hook portion 12, a lid attachment portion 13, a hinge arm portion 14, and a lock engaging portion 15. The engagement hook portion 11 is curved to be along the peripheral surface of the lid hinge pin 21 and pivotably engages with the lid hinge pin 21. The pivoting hook portion 12 is formed integrally with the engagement hook portion 11 and is curved in the direction opposite to the engagement hook portion 11. The fuel lid 1 is attached to the lid attachment portion 13. The hinge arm portion 14 connects the pivoting hook portion 12 and the lid attachment portion 13. The lock engaging portion 15 extends to the side opposite to the fuel lid 1 from the lid attachment portion 13. The lid hinge 10 is assembled to the lid box 20, to pivot about the lid hinge pin 21 and to be unlikely to escape from the pivoting space S1, by the engagement hook portion 11 and the pivoting hook portion 12 being inserted to the outside hinge support portion 30 side through the communication opening 27*a* of the front wall portion 27 from the space S2 of the box body portion 22, the engagement hook portion 11 being engaged with the lid hinge pin 21, and then the inside hinge support portion 31 being attached to the outside hinge support portion 30.

The fuel lid 1 is metallic, blocks the fuel opening portion 61 in the closed state, and constitutes the design surface of the vehicle body 60 with the metallic side member outer panel 62 as a result. The fuel lid 1 may be a resin molded article as well.

In the fuel lid structure configured as described above and in the closed state that is illustrated in FIG. 2, the lock engaging portion 15 engages with the lock pin 52 protruding from the lock hole 28*a*. As a result, a state is maintained where the fuel opening portion 61 is blocked by the fuel lid 1. In this state, the outer peripheral surface of the pivoting hook portion 12 of the lid hinge 10 hits the inside hinge support portion 31.

Once the lock pin 52 withdraws into the lock hole 28*a* from this state, the lock engaging portion 15 and the lock pin 52 are disengaged from each other and the fuel lid 1 is opened as the lid hinge 10 pivots. The fuel lid structure according to the first embodiment of the disclosure is provided with a lock mechanism causing the lock pin 52 to advance and withdraw from the lock hole 28*a* and a mechanism such as a spring giving a biasing force to open the fuel lid 1 as the lock engaging portion 15 and the lock pin 52 are disengaged from each other. For convenience of description, the spring and so on will be neither illustrated nor described here.

In the maximum open state illustrated in FIG. 4, the fuel lid 1 opens until a front end portion 1a of the fuel lid 1 grazes the side member outer panel 62. Still, further opening does not occur because the inner peripheral surface of the pivoting hook portion 12 of the pivoting lid hinge 10 hits the stopper portion 33 of the outside hinge support portion 30.

Alerting Unit

Figure 5A:
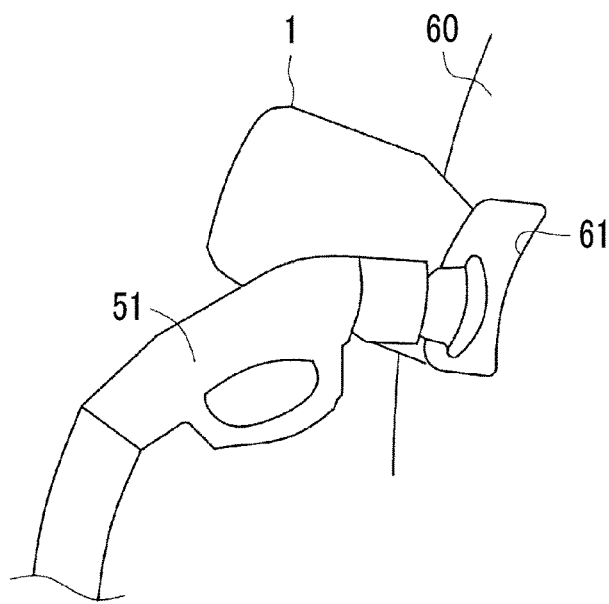
FIG. 5A is a diagram schematically illustrating a state where a replenishment gun is inserted in a fuel opening portion in a fuel cell vehicle.
Figure 5B:
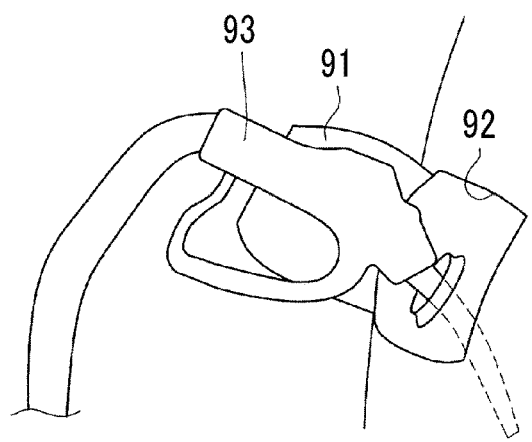
FIG. 5B is a diagram schematically illustrating a state where a replenishment gun is inserted in a fuel opening portion in an engine vehicle.
Figure 6:
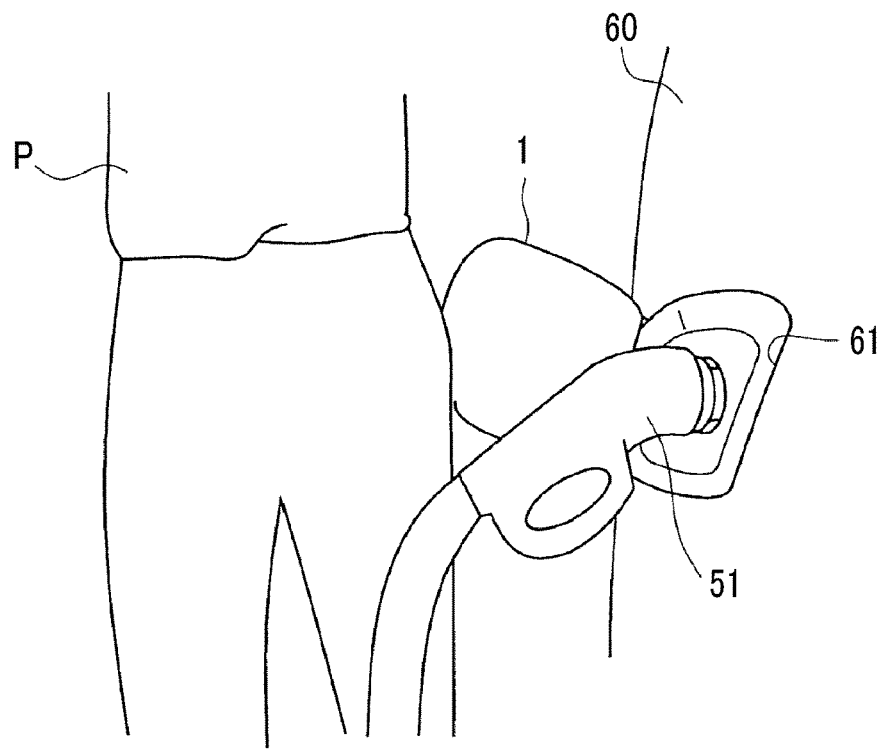
FIG. 6 is a diagram schematically illustrating a state where a replenishment worker's buttocks hit the fuel lid open during vehicle energy replenishment.
Figure 16:
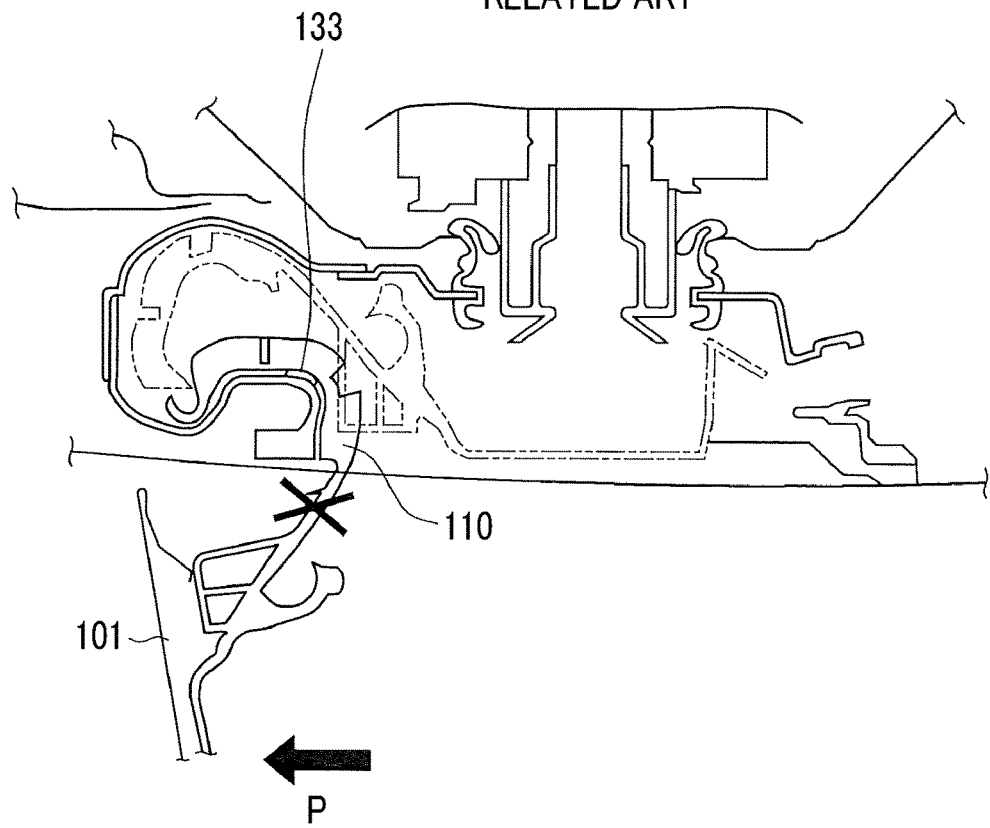
FIG. 16 is a cross-sectional view schematically illustrating a fuel lid structure according to the related art.

FIGS. 5A and 5B is a diagram schematically illustrating a state where a replenishment gun (the hydrogen filling gun 51 and a refueling gun 93) is inserted in the fuel opening portion 61 and a fuel opening portion 92. FIG. 5A is a diagram illustrating the case of a fuel cell vehicle, and FIG. 5B is a diagram illustrating the case of an engine vehicle. FIG. 6 is a diagram schematically illustrating a state where the buttocks of an energy replenishment worker (hereinafter, simply referred to as a "replenishment worker") P hit the fuel lid 1 open during vehicle energy replenishment. FIG. 16 is a cross-sectional view schematically illustrating the fuel lid structure according to the related art.

Usually, the posture of the fuel lid 1 in the vehicle body 60 depends on the side member outer panel 62 constituting the design surface. In other words, the lid hinge pin 21 is set so as to extend in parallel to the side member outer panel 62. Accordingly, in relatively many cases, the fuel lid 1 is opened obliquely upwards as illustrated in FIGS. 5A and 5B.

In the case of engine vehicles, the refueling gun 93 is inserted obliquely downwards into the fuel opening portion 92 in most cases. Accordingly, as illustrated in FIG. 5B, the refueling gun 93 and a fuel lid 91 opened obliquely upwards have an easy-wrap structure when seen in the vehicle front-rear direction, that is, a structure in which the body or the like of the replenishment worker P is unlikely to hit the fuel lid 91 open during vehicle energy replenishment.

A fuel cell vehicle, in the meantime, is filled with high-pressure hydrogen gas cooled to 40° C. below zero. Accordingly, when a structure is adopted in which the hydrogen filling gun 51 is inserted obliquely downwards into the fuel opening portion 61, that is, the filling port 50 faces obliquely upwards, water such as rainwater will stagnate at the filling port 50, the water will freeze due to the high-pressure hydrogen gas with a temperature of 40° C. below zero, and a check valve (not illustrated) preventing hydrogen leakage will open as the case may be. Accordingly, in the case of fuel cell vehicles, a structure in which no water stagnates at the filling port 50 needs to be adopted, a structure in which the hydrogen filling gun 51 is horizontally inserted into the fuel opening portion 61 to be more specific. Therefore, in the case of many fuel cell vehicles, the hydrogen filling gun 51 and the fuel lid 1 opened obliquely upwards have a hard-wrap structure when seen in the vehicle front-rear direction as illustrated in FIG. 5A, that is, a structure in which the body or the like of the replenishment worker P is likely to hit the fuel lid 1 open during vehicle energy replenishment. Hydrogen filling takes a few minutes (three to eight minutes, for example). Accordingly, in the case of many fuel cell vehicles, the buttocks or the like of the replenishment worker P accidentally hit the fuel lid 1 open during vehicle energy replenishment as illustrated in FIG. 6, which has to do with the fact that the replenishment worker P is likely to move around during vehicle energy replenishment.

Therefore, in the fuel lid structure according to the related art, the buttocks or the like of the replenishment worker P may hit, as indicated by the black arrow in FIG. 16, a fuel lid 101 remaining open by being hit by a lid hinge 110 and a stopper portion 133 as illustrated in FIG. 16. An excessive external force may be applied as a result, and then the lid hinge 110, which is a resin molded article, may be broken (damaged) (refer to the x mark in FIG. 16).

In this regard, the fuel lid structure according to the first embodiment of the disclosure is provided with alerting units. In a case where the fuel lid 1 is opened by more than a predetermined angle by the body or the like of the replenishment worker P hitting the fuel lid 1, the alerting units alert the replenishment worker P to the body or the like of the replenishment worker P hitting the fuel lid 1 by imparting a sense of resistance. Specifically, the fuel lid structure according to the first embodiment of the disclosure has a first projecting portion 16 and a first recessed portion 34 as the alerting units. The first projecting portion 16 is provided at the lid hinge 10, and the first recessed portion 34 is provided in the lid box 20. The first projecting portion 16 is fitted into the first recessed portion 34 during opening of the fuel lid 1.

Figure 7:
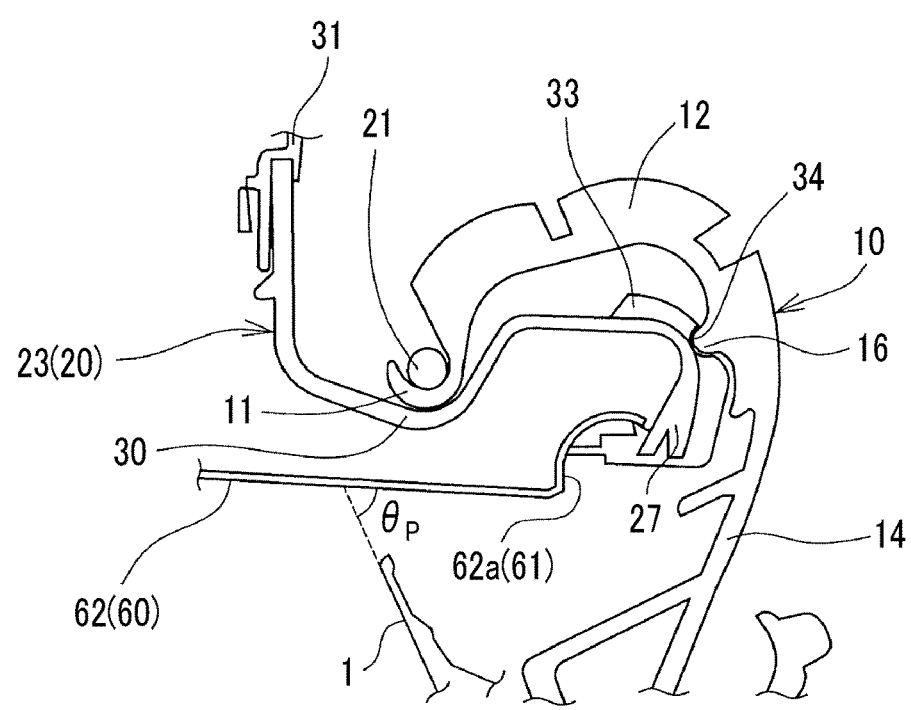
FIG. 7 is an enlarged cross-sectional view schematically illustrating the VII part in FIG. 3.

FIG. 7 is an enlarged cross-sectional view schematically illustrating the VII part in FIG. 3. More specifically, the first projecting portion 16 is formed so as to protrude inwards on the inner peripheral side of the pivoting hook portion 12 of the lid hinge 10. The first recessed portion 34 is formed so as to be positioned in the boundary portion between the front wall portion 27 of the lid box 20 and the outside hinge support portion 30 and on a side closer to the front wall portion 27 than the stopper portion 33.

The stopper portion 33 and the first projecting and recessed portions 16, 34 have a positional relationship in which fitting occurs between the first projecting portion 16 and the first recessed portion 34 when the fuel lid 1 is opened by a predetermined angle $\theta_P$ ($0 < \theta_P < \theta_{Max}$) in a case where the open angle of the fuel lid 1 in the closed state is 0° and the open angle of the fuel lid 1 in the maximum open state where the lid hinge 10 hits the stopper portion 33 (hereinafter, also referred to as the "maximum open angle") is $\theta_{MAX}$. The predetermined angle $\theta_P$ is set to the standard open angle of the fuel lid 1 during vehicle energy replenishment that does not interfere with the replenishment worker P inserting the hydrogen filling gun 51 into the fuel opening portion 61.

Therefore, in the fuel lid structure according to the first embodiment of the disclosure, the fuel lid 1 adopts the closed state illustrated in FIG. 2 where the open angle is 0°, the mid-filling open state illustrated in FIG. 3 where the open angle is the predetermined angle $\theta_P$ and the first projecting portion 16 and the first recessed portion 34 are fitted with each other, and the maximum open state illustrated in FIG. 4 where the open angle is the maximum open angle $\theta_{MAX}$ and the inner peripheral surface of the pivoting hook portion 12 of the lid hinge 10 hits the stopper portion 33. For convenience of description, in the following description, the side in the pivoting direction of the lid hinge 10 on which the open angle of the fuel lid 1 decreases will be referred to as a closed side and the side in the pivoting direction of the lid hinge 10 on which the open angle of the fuel lid 1 increases will be referred to as an open side in some cases.

Figure 8A:
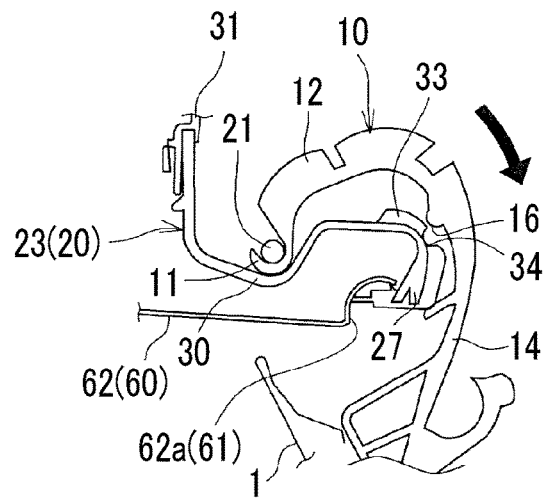
FIG. 8A is a cross-sectional view schematically illustrating a process in which the fuel lid is opened.
Figure 8B:
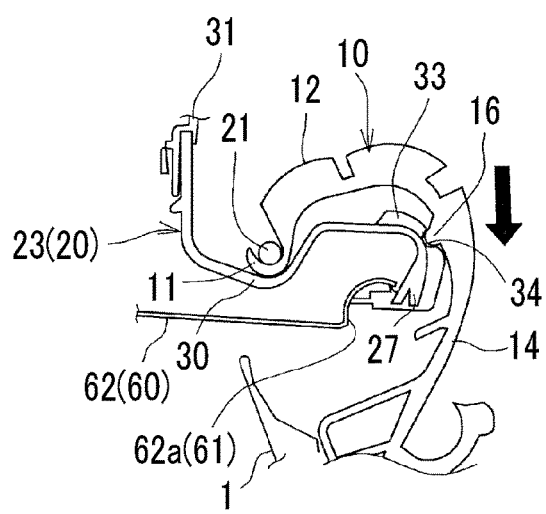
FIG. 8B is a cross-sectional view schematically illustrating the process in which the fuel lid is opened.

FIG. 8A to 8D is a cross-sectional view schematically illustrating a process in which the fuel lid 1 is opened. Once the lid hinge 10 pivots to the open side about the lid hinge pin 21 as indicated by the black arrow in FIG. 8A and the fuel lid 1 is opened by the predetermined angle $\theta_P$ as illustrated in FIG. 8B, the first projecting portion 16 is fitted into the first recessed portion 34, and then pivoting of the lid hinge 10 is restricted and a state is maintained where the fuel lid 1 is open by the predetermined angle $\theta_P$. As described above, the predetermined angle $\theta_P$ is set to the standard open angle of the fuel lid 1 during vehicle energy replenishment, and thus the replenishment worker P can smoothly perform hydrogen filling.

Figure 8C:
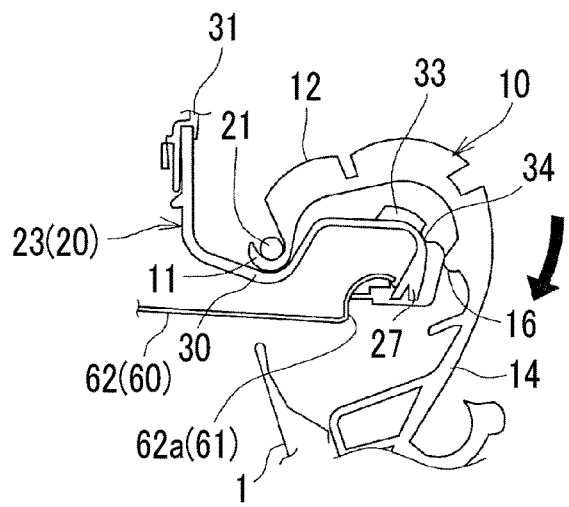
FIG. 8C is a cross-sectional view schematically illustrating the process in which the fuel lid is opened.
Figure 8D:
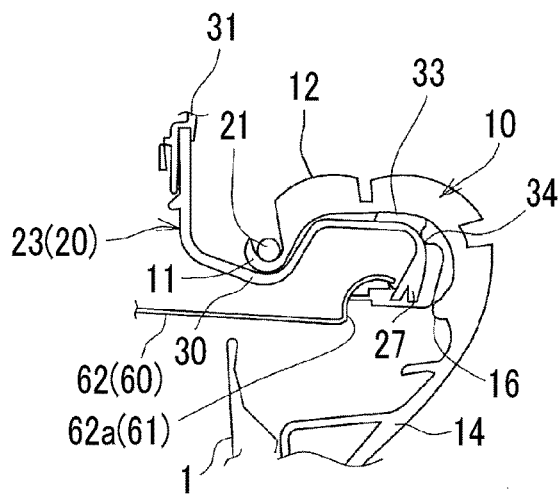
FIG. 8D is a cross-sectional view schematically illustrating the process in which the fuel lid is opened.

Subsequently, once an external force is applied to the fuel lid 1 by the buttocks or the like of the replenishment worker P moving around during the energy replenishment accidently hitting the fuel lid 1, the fuel lid 1 is opened by more than the predetermined angle $\theta_P$ as indicated by the black arrow in FIG. 8C. Then, the first projecting portion 16 climbs over the first recessed portion 34, and then the lid hinge 10 hits the stopper portion 33 and the fuel lid 1 is put into the maximum open state as illustrated in FIG. 8D. The protruding height of the first projecting portion 16 and the depth of the first recessed portion 34 are set, based on the operational force that is caused by the body or the like of the replenishment worker P hitting the fuel lid 1, the sliding resistance between the first projecting portion 16 and the first recessed portion 34, and the proof strength of the lid hinge 10, to a height and a depth allowing the first projecting portion 16 to escape from the first recessed portion 34 at a load at which the lid hinge 10, which is a resin molded article, is not damaged.

The predetermined angle $\theta_P$ is set to be smaller than the maximum open angle $\theta_{MAX}$ of the fuel lid 1. Accordingly, damage to the lid hinge 10, which is a resin molded article, can be suppressed, even in a case where the buttocks or the like of the replenishment worker P accidentally hit the fuel lid 1, as there is a margin (pivoting margin) until the fuel lid 1 reaches the maximum open angle $\theta_{MAX}$ after exceeding the predetermined angle $\theta_P$.

Further, by the first projecting portion 16 climbing over the first recessed portion 34, a sense of resistance is imparted to the replenishment worker P's body, and thus it is possible to alert the replenishment worker P to the body or the like of the replenishment worker P hitting the fuel lid 1. Therefore, it is possible to, for example, suppress the replenishment worker P's buttocks or the like hitting the fuel lid 1 in the maximum open state again. As a result, damage to the lid hinge 10, which is a resin molded article, can be suppressed.

A state where pivoting of the lid hinge 10 is restricted is maintained, even in a case where the body or the like of the replenishment worker P accidentally hits the fuel lid 1 open during vehicle energy replenishment, when, for example, the hitting is weak and the first projecting portion 16 does not climb over the first recessed portion 34. Accordingly, damage to the lid hinge 10 can be suppressed as a matter of course. Also in the case described above, it is possible to alert the replenishment worker P by hitting the rigid (pivoting-restricted) fuel lid 1.

Modification Examples of First Embodiment

Modification examples of the first embodiment will be described below.

First Modification Example

A first modification example differs from the first embodiment in that two projecting portions 17A, 17B and two recessed portions 35A, 35B are formed. The following description will focus on the difference from the first embodiment.

Figure 9:
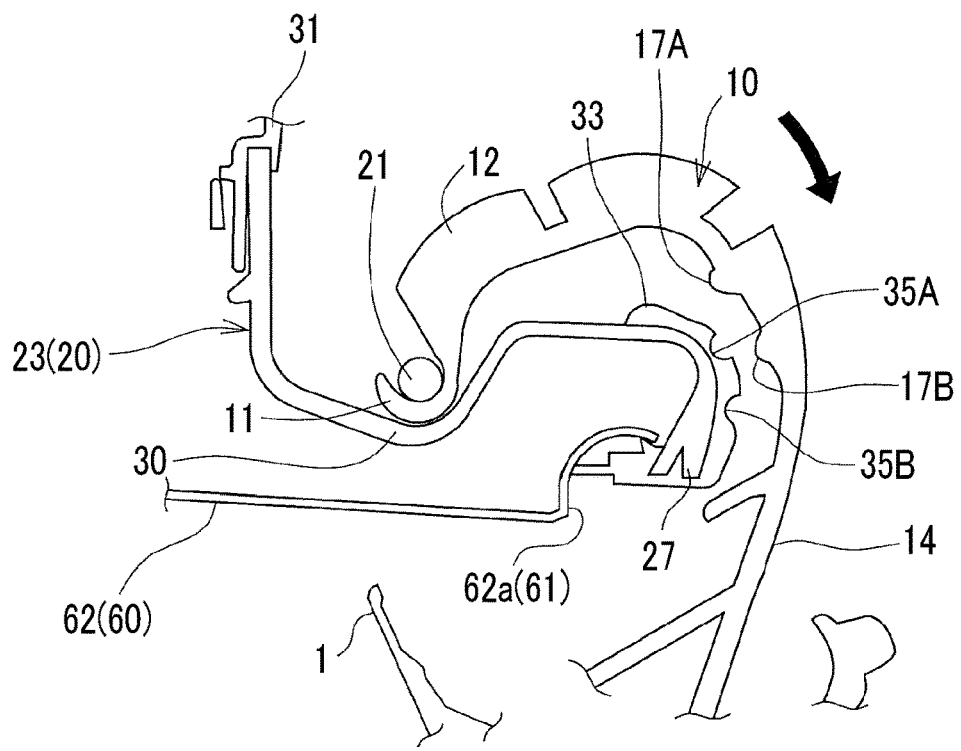
FIG. 9 is a cross-sectional view schematically illustrating a fuel lid structure according to a first modification example of the first embodiment of the disclosure.

FIG. 9 is a cross-sectional view schematically illustrating a fuel lid structure according to the first modification example. As illustrated in FIG. 9, the first projecting portion 17A and the second projecting portion 17B are formed on the lid hinge 10 and the first recessed portion 35A and the second recessed portion 35B are formed in the lid box 20. The first projecting portion 17A and the second projecting portion 17B are fitted into the first recessed portion 35A and the second recessed portion 35B in a process in which the fuel lid 1 is opened.

The first projecting portion 17A is formed at the position in the lid hinge 10 that is the same as the first projecting portion 16 according to the first embodiment, and the second projecting portion 17B is formed closer to the open side than the first projecting portion 17A (here, the meaning of "the same position" includes "substantially the same position"). The first recessed portion 35A is formed in the boundary portion between the front wall portion 27 of the lid box 20 and the outside hinge support portion 30 as in the case of the first recessed portion 34 according to the first embodiment, and the second recessed portion 35B is formed closer to the open side than the first recessed portion 35A in the front wall portion 27 of the lid box 20.

In the first modification example, the second projecting portion 17B is fitted into the first recessed portion 35A once the fuel lid 1 is opened by a first predetermined angle $\theta_{P1}$. Then, pivoting of the lid hinge 10 is restricted and a state is maintained where the fuel lid 1 is open by the first predetermined angle $\theta_{P1}$. Once the replenishment worker P's buttocks hit the fuel lid 1 and the second projecting portion 17B climbs over the first recessed portion 35A from that state, the second projecting portion 17B is fitted into the second recessed portion 35B and the first projecting portion 17A is fitted into the first recessed portion 35A. As a result, a state is maintained where the fuel lid 1 is open by a second predetermined angle $\theta_{P2}$ ($\fallingdotseq$predetermined angle $\theta_P$). In other words, in the first modification example, the first and second projecting portions 17A, 17B are fitted into the first and second recessed portions 35A, 35B while a sense of resistance is imparted to the replenishment worker P's body and the replenishment worker P is alerted by the second projecting portion 17B climbing over the first recessed portion 35A, and thus a state can be created where alerting can be performed once again before the lid hinge 10 hits the stopper portion 33. As described above, a sense of resistance is imparted to the replenishment worker P's body every time the projecting portions 17A, 17B climb over the plurality of recessed portions 35A, 35B. In other words, alerting is performed a plurality of times. Accordingly, damage to the lid hinge 10 can be more reliably suppressed.

A stronger sense of resistance is imparted to the replenishment worker P's body in a case where the first and second projecting portions 17A, 17B climb over the first and second recessed portions 35A, 35B than in a case where the second projecting portion 17B climbs over the first recessed portion 35A. Accordingly, it is possible to alert the replenishment worker P to the body or the like of the replenishment worker P hitting the fuel lid 1 in a more reliable manner.

Second Modification Example

A second modification example differs from the first embodiment in that a protruding portion 36 is formed on the open side of the first recessed portion 34 in the lid box 20. The following description will focus on the difference from the first embodiment.

Figure 10:
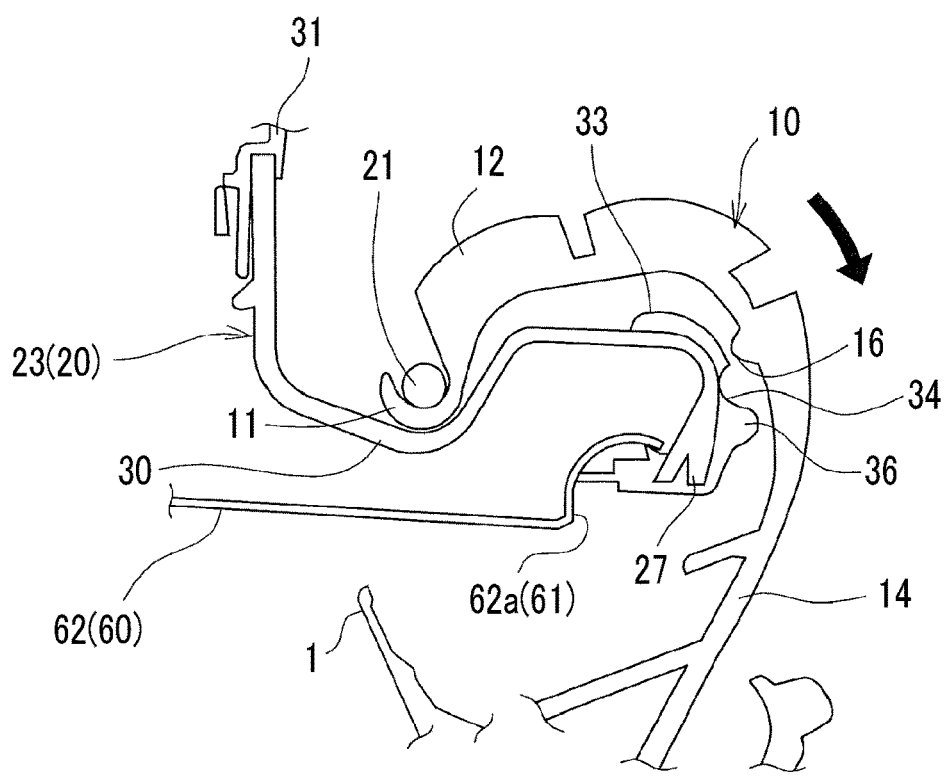
FIG. 10 is a cross-sectional view schematically illustrating a fuel lid structure according to a second modification example of the first embodiment of the disclosure.

FIG. 10 is a cross-sectional view schematically illustrating a fuel lid structure according to the second modification example. As illustrated in FIG. 10, the protruding portion 36 continuous with the first recessed portion 34 and protruding to the side opposite to the first recessed portion 34 is provided on the open side of the first recessed portion 34 in the lid box 20 (side on which the first projecting portion 16 climbs over the first recessed portion 34 in a case where the fuel lid 1 is opened by more than the predetermined angle $\theta_P$).

According to the configuration described above, the first projecting portion 16 should climb over the protruding portion 36 as well when climbing over the first recessed portion 34. Accordingly, the fuel lid 1 is unlikely to pivot even in a case where the replenishment worker P's buttocks or the like accidentally hits the fuel lid 1, and thus damage to the lid hinge 10 can be suppressed and it is possible to alert the replenishment worker P to the body or the like of the replenishment worker P hitting the fuel lid 1.

A stronger sense of resistance is imparted to the replenishment worker P's body, even when the fuel lid 1 pivots, as the first projecting portion 16 climbs over the protruding portion 36. As a result, it is possible to alert the replenishment worker P to the body or the like of the replenishment worker P hitting the fuel lid 1 in a more reliable manner. Accordingly, damage to the lid hinge 10 can be suppressed in a more reliable manner.

The protruding height of the protruding portion 36 is set, based on the operational force that is caused by the body or the like of the replenishment worker P hitting the fuel lid 1, the sliding resistance between the first projecting portion 16 and the protruding portion 36, and the proof strength of the lid hinge 10, to a value allowing the first projecting portion 16 to escape from the first recessed portion 34 and climb over the protruding portion 36 at a load at which the lid hinge 10, which is a resin molded article, is not damaged.

Third Modification Example

A third modification example differs from the first embodiment in that a projecting portion 37 is formed on the peripheral surface of the lid hinge pin 21. The following description will focus on the difference from the first embodiment.

Figure 11:
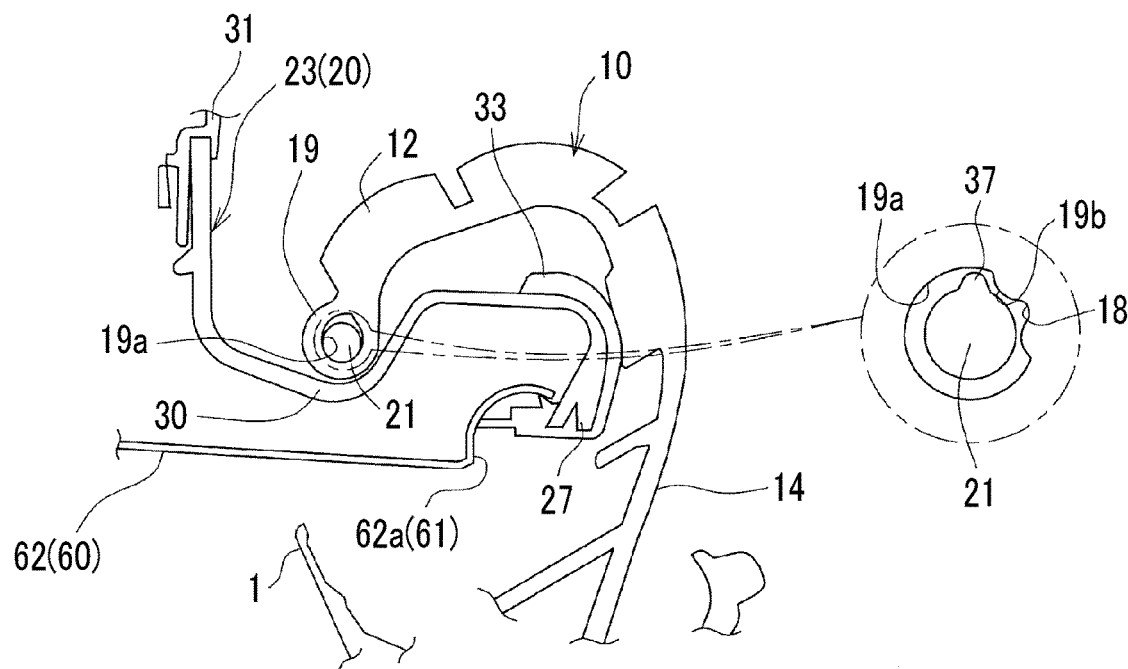
FIG. 11 is a cross-sectional view schematically illustrating a fuel lid structure according to a third modification example of the first embodiment of the disclosure.

FIG. 11 is a cross-sectional view schematically illustrating a fuel lid structure according to the third modification example. In the first embodiment, the first projecting portion 16 is formed on the inner peripheral side of the pivoting hook portion 12 of the lid hinge 10 and the first recessed portion 34 is formed in the boundary portion between the front wall portion 27 of the lid box 20 and the outside hinge support portion 30. Still, a sense of resistance can be imparted by a similar mechanism when, for example, a recessed portion is formed in the lid hinge 10 and a projecting portion is formed on the lid box 20. In addition, a sense of resistance can be imparted by a similar mechanism insofar as a projecting portion and a recessed portion are provided on the lid hinge 10 side and the lid box 20 side.

In this regard, in the third modification example, a recessed portion 18 is provided on the lid hinge 10 side and the projecting portion 37 is provided on the lid hinge pin 21, which is a member on the lid box 20 side, as illustrated in FIG. 11. More specifically, in the lid hinge 10 according to the third modification example, an engaging tubular portion 19 that has a hole 19a into which the lid hinge pin 21 is inserted is formed integrally with the pivoting hook portion 12 in place of the engagement hook portion 11. The recessed portion 18 is formed in the hole wall of the hole 19a in the engaging tubular portion 19. A bulging portion 19b projecting inwards is formed on both sides of the recessed portion 18 in the circumferential direction of the hole 19a. The projecting portion 37, which can be fitted into the recessed portion 18, is formed on the peripheral surface of the lid hinge pin 21.

Also in the third modification example, the projecting portion 37 and the recessed portion 18 have a positional relationship in which fitting occurs between the projecting portion 37 and the recessed portion 18 when the fuel lid 1 is opened by the predetermined angle $\theta_P$ ($0<\theta_P<\theta_{MAX}$). Therefore, also in the third modification example, the projecting portion 37 is fitted into the recessed portion 18 once the fuel lid 1 is opened by the predetermined angle $\theta_P$, and thus pivoting of the lid hinge 10 is restricted and a state is maintained where the fuel lid 1 is open by the predetermined angle $\theta_P$. In order for the projecting portion 37 to be fitted into the recessed portion 18, the projecting portion 37 crosses the bulging portion 19b, and thus a moderate operation feeling is imparted. Once the replenishment worker P's buttocks accidentally hit the fuel lid 1 and the fuel lid 1 is opened by more than the predetermined angle $\theta_P$, the projecting portion 37 climbs over the recessed portion 18. As a result, a sense of resistance is imparted to the replenishment worker P's body and it is possible to alert the replenishment worker P to the body or the like of the replenishment worker P hitting the fuel lid 1.

Second Embodiment

A second embodiment of the disclosure differs from the first embodiment in that alerting is performed by sound emission. The following description will focus on the difference from the first embodiment.

A fuel lid structure according to the second embodiment of the disclosure is provided with alerting units alerting the replenishment worker P to his or her body or the like hitting the fuel lid 1 by emitting a sound whereas the fuel lid structure according to the first embodiment alerts the replenishment worker P by imparting a sense of resistance to the replenishment worker P's body.

Figure 12A:
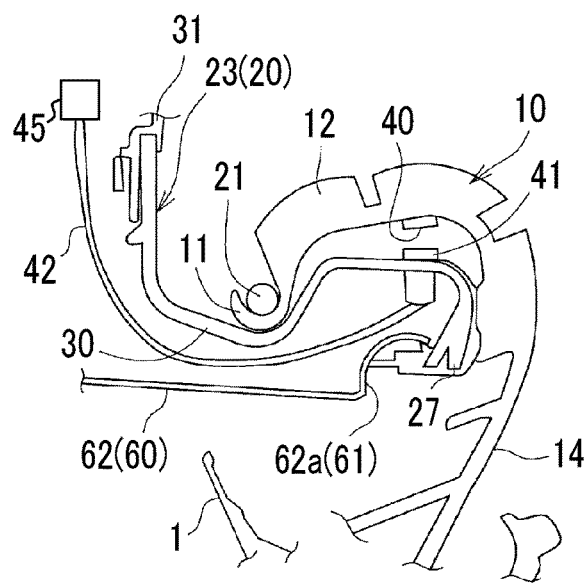
FIG. 12A is a cross-sectional view schematically illustrating a fuel lid structure according to a second embodiment of the disclosure, illustrating a state where a first sensor and a second sensor are yet to come into contact.
Figure 12B:
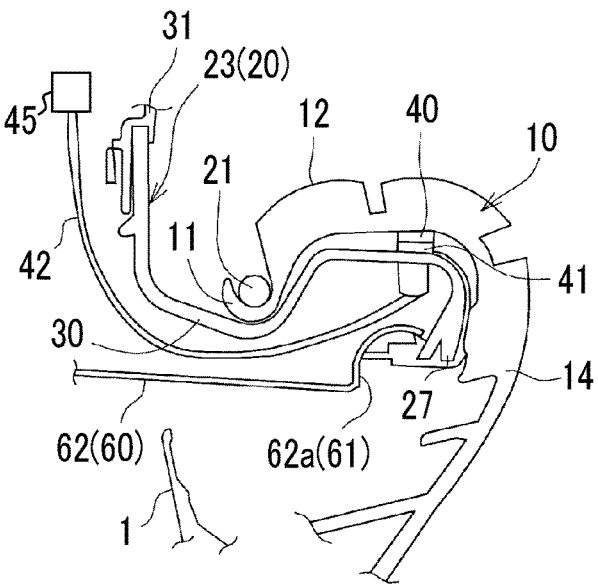
FIG. 12B is a cross-sectional view schematically illustrating the fuel lid structure according to the second embodiment of the disclosure, illustrating a state where the first sensor and the second sensor are in contact.

FIGS. 12A and 12B are cross-sectional views schematically illustrating the fuel lid structure according to the second embodiment of the disclosure. FIG. 12A illustrates a state where a first sensor 40 and a second sensor 41 are yet to come into contact, and FIG. 12B illustrates a state where the first sensor 40 and the second sensor 41 are in contact. The fuel lid structure according to the second embodiment of the disclosure has the first sensor 40, the second sensor 41, and a warning sound generation mechanism 45 as the alerting units. The first sensor 40 is provided on the inner peripheral side of the pivoting hook portion 12 of the lid hinge 10. The second sensor 41 is provided in the outside hinge support portion 30 in the lid box 20. The warning sound generation mechanism emits a warning sound once the first sensor 40 and the second sensor 41 come into contact.

As illustrated in FIG. 12A, in the fuel lid structure according to the second embodiment of the disclosure, the second sensor 41 is attached at the position in the outside hinge support portion 30 of the lid box 20 where the stopper portion 33 is provided, and the second sensor 41 is connected to the warning sound generation mechanism via a communication line 42. As illustrated in FIG. 12B, the first sensor 40 and the second sensor 41 are configured to come into contact in a case where the fuel lid 1 is opened by the maximum open angle $\theta_{MAX}$.

According to the second embodiment of the disclosure, it is possible to reliably alert the replenishment worker P to the body or the like of the replenishment worker P hitting the fuel lid 1, even in a case where the fuel lid 1 is opened by the maximum open angle $\theta_{MAX}$ by the replenishment worker P's buttocks or the like hitting the fuel lid 1, as the warning sound results from contact between the first sensor 40 provided at the lid hinge 10 and the second sensor 41 provided at the lid box 20. Accordingly, the replenishment worker P's body or the like hitting the fuel lid 1 again can be suppressed as in the case of alerting by an imparted sense of resistance. As a result, damage to the lid hinge 10, which is a resin molded article, can be reliably suppressed.

Moreover, according to the second embodiment, the warning sound is emitted even in a case where the replenishment worker P's clothes or the like hit and are caught by the fuel lid 1 open during vehicle energy replenishment, that is, even in a case where a sense of resistance is unlikely to be imparted to the replenishment worker P's body. Accordingly, it is possible to alert the replenishment worker P to hitting of the fuel lid 1 in a reliable manner.

Modification Examples of Second Embodiment

Modification examples of the second embodiment will be described below.

First Modification Example

A first modification example differs from the second embodiment in that a margin is provided until the maximum open state is reached after warning sound generation. The following description will focus on the difference from the second embodiment.

It is desirable that there is a margin until the maximum open state is reached after alerting as in the first embodiment, even in a case where alerting is performed by warning sound emission as in the second embodiment, from the viewpoint of more reliably suppressing damage to the lid hinge 10. In this regard, in the first modification example, a margin is provided until the maximum open state is reached after warning sound generation.

Figure 13:
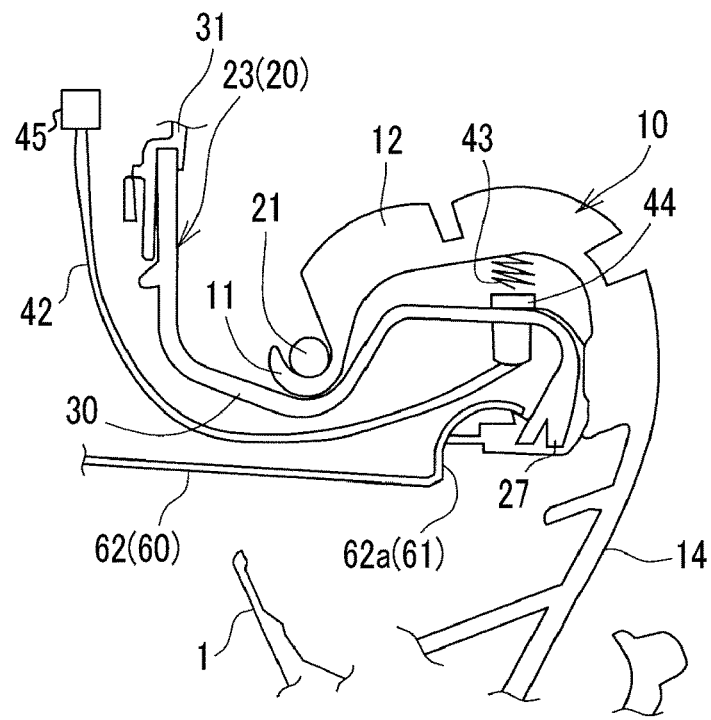
FIG. 13 is a cross-sectional view schematically illustrating a fuel lid structure according to a first modification example of the second embodiment of the disclosure.

FIG. 13 is a cross-sectional view schematically illustrating a fuel lid structure according to the first modification example. The fuel lid structure according to the first modification example has a spring (elastic member) 43, a pressure sensor 44, and a warning sound generation mechanism as alerting units. The spring 43 is provided at the lid hinge 10. The pressure sensor 44 is provided at the lid box 20. The warning sound generation mechanism emits a warning sound once the pressure sensor 44 detects a predetermined pressure.

As illustrated in FIG. 13, in the fuel lid structure according to the first modification example, the pressure sensor 44 is attached at the position in the outside hinge support portion 30 of the lid box 20 where the stopper portion 33 is provided, and the pressure sensor 44 is connected to the warning sound generation mechanism via the communication line 42. The spring 43 is attached at the position on the inner peripheral side of the pivoting hook portion 12 of the lid hinge 10 that corresponds to the pressure sensor 44. The spring 43 and the pressure sensor 44 are configured such that the spring 43 and the pressure sensor 44 come into contact and the predetermined pressure is imparted from the spring 43 to the pressure sensor 44 in a case where the fuel lid 1 is opened by more than a third predetermined angle $\theta_{P3}$, which is set to be smaller than the maximum open angle $\theta_{MAX}$.

According to the first modification example, a predetermined pressure is imparted from the spring 43 to the pressure sensor 44 and a warning sound is emitted once the fuel lid 1 is opened by more than the third predetermined angle $\theta_{P3}$ by the replenishment worker P's buttocks or the like hitting the fuel lid 1. Accordingly, it is possible to reliably alert the replenishment worker P to the replenishment worker P's body or the like hitting the fuel lid 1. Moreover, damage to the lid hinge 10, which is a resin molded article, can be more reliably suppressed as there is a margin, to the same extent as shrinkage of the spring 43, until the fuel lid 1 reaches the maximum open angle $\theta_{MAX}$ after exceeding the third predetermined angle $\theta_{P3}$.

Second Modification Example

A second modification example differs from the second embodiment in that a warning sound is emitted in a case where the lid hinge 10 further deflects from the maximum open state. The following description will focus on the difference from the second embodiment.

Figure 14:
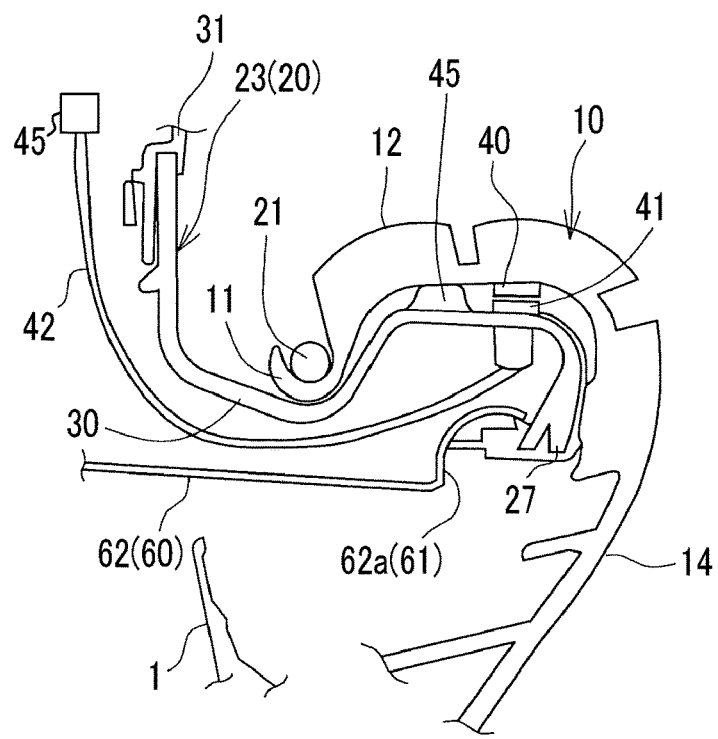
FIG. 14 is a cross-sectional view schematically illustrating a fuel lid structure according to a second modification example of the second embodiment of the disclosure.

FIG. 14 is a cross-sectional view schematically illustrating a fuel lid structure according to the second modification example. As illustrated in FIG. 14, in the fuel lid structure according to the second modification example, a stopper portion 45 is formed closer to the closed side than the second sensor 41 in the outside hinge support portion 30 of the lid box 20, and the fuel lid 1 is put into the maximum open state when the inner peripheral surface of the pivoting hook portion 12 of the lid hinge 10 hits the stopper portion 45. The projection height of the stopper portion 45 is set to a height allowing the first sensor 40 and the second sensor 41 to come into contact when there is any deflection of the lid hinge 10 from the maximum open state.

According to the second modification example, it is possible to alert the replenishment worker P to the body or the like of the replenishment worker P hitting the fuel lid 1 and vigorous contact between the first sensor 40 and the second sensor 41 can be suppressed even in a case where the fuel lid 1 is put into the maximum open state by the replenishment worker P's buttocks or the like hitting the fuel lid 1.

OTHER EMBODIMENTS

The disclosure is not limited to the above embodiments, and can be implemented in various other forms without departing from the spirit or main characteristics thereof.

In the above-described first embodiment and the modification examples of the first embodiment, alerting is performed by means of a sense of resistance caused by the projecting portion climbing over the recessed portion. In the above-described second embodiment and the modification examples of the second embodiment, alerting is performed by sensor detection-based sound generation. However, the disclosure is not limited thereto, and the projecting and recessed portions (engaging and engaged portions) and the sensor may be combined as well.

For example, when the replenishment worker P's buttocks or the like accidentally hit the fuel lid 1 from the state where the fuel lid 1 is opened by the predetermined angle $\theta_P$ by the first projecting portion 16 being fitted into the first recessed portion 34, first alerting may be performed first in which a sense of resistance is imparted by the first projecting portion 16 climbing over the first recessed portion 34 and second alerting, in which the first sensor 40 and the second sensor 41 come into contact to emit a sound, may be performed once the fuel lid 1 reaches the maximum open angle $\theta_{MAX}$.

In the above-described first embodiment and the modification examples of the first embodiment, the projecting portions 16, 17A, 17B are formed on the lid hinge 10 and the recessed portion 34, 35A, 35B are formed in the lid box 20. However, the disclosure is not limited thereto. Alternatively, the projecting portion may be formed on the lid box 20 with the recessed portion formed in the lid hinge 10.

Figure 15:
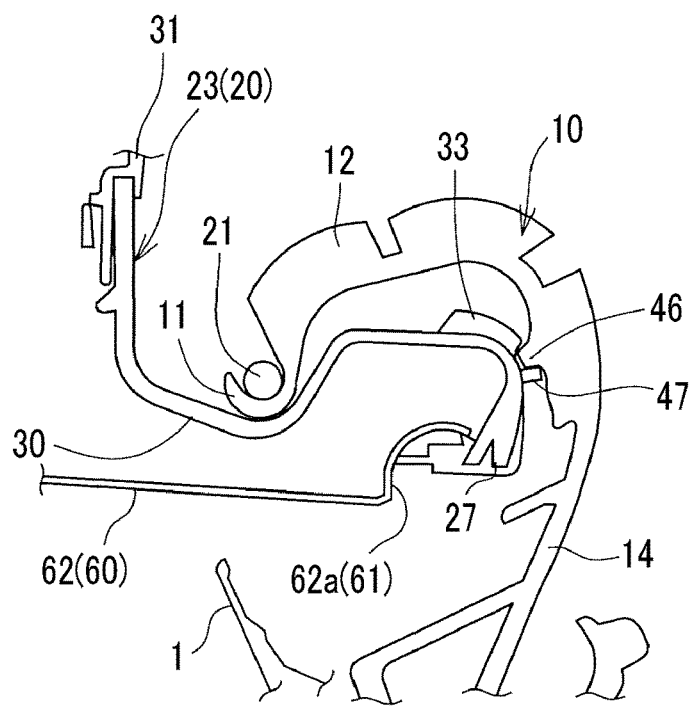
FIG. 15 is a cross-sectional view schematically illustrating a fuel lid structure according to another embodiment of the disclosure.

In the above-described first embodiment and the modification examples of the first embodiment, the projecting portion and the recessed portion are adopted as the engaging portion and the engaged portion. However, the disclosure is not limited thereto. As illustrated in FIG. 15, also possible is an alternative configuration in which an abutting portion (engaging portion) 46 provided at the lid hinge 10 and an abutting plate (engaged portion) 47 made of rubber and attached to the lid box 20 with an adhesive or the like are provided as alerting units, the abutting portion 46 and the abutting plate 47 abut (engage) in a case where the fuel lid 1 is opened by the predetermined angle $\theta_P$, and, in a case where the fuel lid 1 is opened by more than the predetermined angle $\theta_P$, a sense of resistance is imparted as a result of deformation of the rubber-based abutting plate 47 and disengagement between the abutting portion 46 and the abutting plate 47.

In each embodiment and modification example described above, the disclosure is applied to a fuel cell vehicle. However, the disclosure is not limited thereto, and the disclosure may also be applied to an EV and the like.

As described above, the above-described embodiments are merely examples in all respects, and should not be interpreted restrictively. Furthermore, all variations and modifications falling within the scope of the claims are within the scope of the disclosure.

According to the embodiments of the disclosure, damage to a resinous lid hinge attached to a fuel lid can be suppressed even in a case where a replenishment worker's buttocks or the like accidentally hit the fuel lid, and thus the disclosure is highly useful when applied to a fuel lid structure.

What is claimed is:

1. A fuel lid structure comprising:
   a lid box constituting a fuel opening portion of a vehicle body;
   a lid hinge that is made of resin and is pivotable with respect to the lid box;
   a fuel lid body pivotably attached to the lid box via the lid hinge; and
   an alerting unit configured to alert a replenishment worker to a body of the replenishment worker hitting the fuel lid body in an open state by at least one of imparting of a sense of resistance and emission of a sound, the alerting unit including:
   an engaging portion provided at the lid hinge;
   an engaged portion provided at the lid box and engageable with the engaging portion;
   a first sensor provided at the lid hinge;
   a second sensor provided at the lid box; and
   a warning sound generation mechanism configured to emit a warning sound upon contact between the first sensor and the second sensor;
   wherein:
   the engaging portion and the engaged portion are configured to engage in a case where the fuel lid body is opened by a predetermined angle set to be smaller than a maximum open angle and to impart the sense of resistance by disengagement in a case where the fuel lid body is opened by more than the predetermined angle; and
   the first sensor and the second sensor are disposed so as to come into contact with each other in a case where the fuel lid body is opened by a maximum open angle.

2. The fuel lid structure according to claim 1, wherein:
   the engaging portion is provided with a first projecting portion;
   the engaged portion is a first recessed portion into which the first projecting portion is fitted during a process in which the fuel lid body is opened; and
   the first projecting portion and the first recessed portion are configured to be fitted in the case where the fuel lid body is opened by the predetermined angle and to impart the sense of resistance by the first projecting portion climbing over the first recessed portion in the case where the fuel lid body is opened by more than the predetermined angle.

3. The fuel lid structure according to claim 2, wherein a plurality of the first projecting portions and a plurality of the first recessed portions are provided.

4. The fuel lid structure according to claim 2, wherein a protruding portion is provided in the lid box, the protruding portion being continuous with the first recessed portion and protruding to a side opposite to the first recessed portion, the protruding portion being provided on a side of the first recessed portion in the lid box to which the first projecting portion moves in the case where the fuel lid body is opened by more than the predetermined angle.

5. The fuel lid structure according to claim 1, wherein:
   the lid box has a hinge pin;
   the lid hinge is pivotable with respect to the lid box about the hinge pin by the hinge pin being inserted into a hole formed in the lid hinge;
   the engaging portion includes a second recessed portion formed in a hole wall of the hole;
   the engaged portion is a second projecting portion formed on a peripheral surface of the hinge pin; and
   the second projecting portion and the second recessed portion are configured to be fitted in the case where the fuel lid body is opened by the predetermined angle and to impart the sense of resistance by the second projecting portion climbing over the second recessed portion in the case where the fuel lid body is opened by more than the predetermined angle.

6. The fuel lid structure according to claim 1, wherein:
   the alerting unit includes
   a pressure sensor provided at any one of the lid hinge and the lid box,
   an elastic member provided at the other of the lid hinge and the lid box, and
   a warning sound generation mechanism configured to emit a warning sound upon detection of a predetermined pressure by the pressure sensor; and
   the pressure sensor and the elastic member are disposed such that the predetermined pressure is imparted from the elastic member to the pressure sensor in a case where the fuel lid body is opened by more than a predetermined angle set to be smaller than a maximum open angle.

7. A fuel lid structure comprising:
   a lid box constituting a fuel opening portion of a vehicle body;
   a lid hinge that is made of resin and is pivotable with respect to the lid box;
   a fuel lid body pivotably attached to the lid box via the lid hinge; and a mechanism configured to execute at least one of suppression of pivoting of the fuel lid body in an open state at a predetermined angle set to be smaller than a maximum open angle in an open direction and emission of a warning sound in a case where a force to pivot the fuel lid body in the open direction by more than the predetermined angle is imparted to the fuel lid body, the mechanism including:
  an engaging portion provided at the lid hinge;
  an engaged portion provided at the lid box and engageable with the engaging portion;
  a first sensor provided at the lid hinge;
  a second sensor provided at the lid box; and
  a warning sound generation mechanism configured to emit the warning sound upon contact between the first sensor and the second sensor;
wherein:
  the engaging portion and the engaged portion are configured to engage in a case where the fuel lid body is opened by the predetermined angle and to resist the pivoting by disengagement in a case where the fuel lid body is opened by more than the predetermined angle; and
  the first sensor and the second sensor are disposed so as to come into contact with each other in a case where the fuel lid body is opened by a maximum open angle.

8. The fuel lid structure according to claim 7, wherein:
the engaging portion is provided with a first projecting portion;
the engaged portion is a first recessed portion into which the first projecting portion is fitted during a process in which the fuel lid body is opened; and
the first projecting portion and the first recessed portion are configured to be fitted in the case where the fuel lid body is opened by the predetermined angle and to resist the pivoting by the first projecting portion climbing over the first recessed portion in the case where the fuel lid body is opened by more than the predetermined angle.

9. The fuel lid structure according to claim 8, wherein a plurality of the first projecting portions and a plurality of the first recessed portions are provided.

10. The fuel lid structure according to claim 8, wherein a protruding portion is provided in the lid box, the protruding portion being continuous with the first recessed portion and protruding to a side opposite to the first recessed portion, the protruding portion being provided on a side of the first recessed portion in the lid box to which the first projecting portion moves in the case where the fuel lid body is opened by more than the predetermined angle.

11. The fuel lid structure according to claim 7, wherein:
the lid box has a hinge pin;
the lid hinge is pivotable with respect to the lid box about the hinge pin by the hinge pin being inserted into a hole formed in the lid hinge;
the engaging portion includes a second recessed portion formed in a hole wall of the hole;
the engaged portion is a second projecting portion formed on a peripheral surface of the hinge pin; and
the second projecting portion and the second recessed portion are configured to be fitted in the case where the fuel lid body is opened by the predetermined angle and to resist the pivoting by the second projecting portion climbing over the second recessed portion in the case where the fuel lid body is opened by more than the predetermined angle.

12. A fuel lid structure comprising:
a lid box constituting a fuel opening portion of a vehicle body;
a lid hinge that is made of resin and is pivotable with respect to the lid box;
a fuel lid body pivotably attached to the lid box via the lid hinge; and
an alerting unit configured to alert a replenishment worker to a body of the replenishment worker hitting the fuel lid body in an open state by at least one of imparting of a sense of resistance and emission of a sound, the alerting unit including:
  an engaging portion provided at the lid hinge;
  an engaged portion provided at the lid box and engageable with the engaging portion;
  a pressure sensor provided at any one of the lid hinge and the lid box;
  an elastic member provided at the other of the lid hinge and the lid box; and
  a warning sound generation mechanism configured to emit a warning sound upon detection of a predetermined pressure by the pressure sensor;
wherein:
  the engaging portion and the engaged portion are configured to engage in a case where the fuel lid body is opened by a predetermined angle set to be smaller than a maximum open angle and to impart the sense of resistance by disengagement in a case where the fuel lid body is opened by more than the predetermined angle; and
  the pressure sensor and the elastic member are disposed such that the predetermined pressure is imparted from the elastic member to the pressure sensor in a case where the fuel lid body is opened by more than a predetermined angle set to be smaller than a maximum open angle.

13. The fuel lid structure according to claim 12, wherein:
the engaging portion is provided with a first projecting portion;
the engaged portion is a first recessed portion into which the first projecting portion is fitted during a process in which the fuel lid body is opened; and
the first projecting portion and the first recessed portion are configured to be fitted in the case where the fuel lid body is opened by the predetermined angle and to impart the sense of resistance by the first projecting portion climbing over the first recessed portion in the case where the fuel lid body is opened by more than the predetermined angle.

14. The fuel lid structure according to claim 13, wherein a plurality of the first projecting portions and a plurality of the first recessed portions are provided.

15. The fuel lid structure according to claim 13, wherein a protruding portion is provided in the lid box, the protruding portion being continuous with the first recessed portion and protruding to a side opposite to the first recessed portion, the protruding portion being provided on a side of the first recessed portion in the lid box to which the first projecting portion moves in the case where the fuel lid body is opened by more than the predetermined angle.

16. The fuel lid structure according to claim 12, wherein:
the lid box has a hinge pin;
the lid hinge is pivotable with respect to the lid box about the hinge pin by the hinge pin being inserted into a hole formed in the lid hinge;
the engaging portion includes a second recessed portion formed in a hole wall of the hole;

the engaged portion is a second projecting portion formed on a peripheral surface of the hinge pin; and the second projecting portion and the second recessed portion are configured to be fitted in the case where the fuel lid body is opened by the predetermined angle and to impart the sense of resistance by the second projecting portion climbing over the second recessed portion in the case where the fuel lid body is opened by more than the predetermined angle.

17. A fuel lid structure comprising:

a lid box constituting a fuel opening portion of a vehicle body;

a lid hinge that is made of resin and is pivotable with respect to the lid box;

a fuel lid body pivotably attached to the lid box via the lid hinge; and a mechanism configured to execute at least one of suppression of pivoting of the fuel lid body in an open state at a predetermined angle set to be smaller than a maximum open angle in an open direction and emission of a warning sound in a case where a force to pivot the fuel lid body in the open direction by more than the predetermined angle is imparted to the fuel lid body, the mechanism including:

an engaging portion provided at the lid hinge;

an engaged portion provided at the lid box and engageable with the engaging portion;

a pressure sensor provided at any one of the lid hinge and the lid box;

an elastic member provided at the other of the lid hinge and the lid box; and a warning sound generation mechanism configured to emit the warning sound upon detection of a predetermined pressure by the pressure sensor;

wherein:

the engaging portion and the engaged portion are configured to engage in a case where the fuel lid body is opened by the predetermined angle and to impart the suppression of pivoting by disengagement in a case where the fuel lid body is opened by more than the predetermined angle; and the pressure sensor and the elastic member are disposed such that the predetermined pressure is imparted from the elastic member to the pressure sensor in a case where the fuel lid body is opened by more than the predetermined angle.

18. The fuel lid structure according to claim 17, wherein:

the engaging portion is provided with a first projecting portion;

the engaged portion is a first recessed portion into which the first projecting portion is fitted during a process in which the fuel lid body is opened; and the first projecting portion and the first recessed portion are configured to be fitted in the case where the fuel lid body is opened by the predetermined angle and to resist the pivoting by the first projecting portion climbing over the first recessed portion in the case where the fuel lid body is opened by more than the predetermined angle.

19. The fuel lid structure according to claim 18, wherein a plurality of the first projecting portions and a plurality of the first recessed portions are provided.

20. The fuel lid structure according to claim 18, wherein a protruding portion is provided in the lid box, the protruding portion being continuous with the first recessed portion and protruding to a side opposite to the first recessed portion, the protruding portion being provided on a side of the first recessed portion in the lid box to which the first projecting portion moves in the case where the fuel lid body is opened by more than the predetermined angle.

21. The fuel lid structure according to claim 17, wherein:

the lid box has a hinge pin;

the lid hinge is pivotable with respect to the lid box about the hinge pin by the hinge pin being inserted into a hole formed in the lid hinge;

the engaging portion includes a second recessed portion formed in a hole wall of the hole;

the engaged portion is a second projecting portion formed on a peripheral surface of the hinge pin; and the second projecting portion and the second recessed portion are configured to be fitted in the case where the fuel lid body is opened by the predetermined angle and to resist the pivoting by the second projecting portion climbing over the second recessed portion in the case where the fuel lid body is opened by more than the predetermined angle.

* * * * *